(12) United States Patent
Kim et al.

(10) Patent No.: US 7,881,083 B2
(45) Date of Patent: Feb. 1, 2011

(54) SWITCH CONTROL DEVICE, SWITCH CONTROL METHOD, AND CONVERTER USING THE SAME

(75) Inventors: Jin-Tae Kim, Bucheon (KR); Gwan-Bon Koo, Bucheon (KR); Hang-Seok Choi, Gunpo (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 426 days.

(21) Appl. No.: 12/154,207

(22) Filed: May 21, 2008

(65) Prior Publication Data

US 2008/0290850 A1    Nov. 27, 2008

(30) Foreign Application Priority Data

May 21, 2007   (KR)   ...................... 10-2007-0049136

(51) Int. Cl.
H02M 7/44 (2006.01)
(52) U.S. Cl. .................... 363/97; 363/21.08; 323/222
(58) Field of Classification Search ............. 363/16–20, 363/21.01, 21.02, 21.08, 21.16, 21.17, 97, 363/95, 56.01, 56.11; 323/282–287, 222, 323/224, 225, 271; 327/108, 310, 543
See application file for complete search history.

(56) References Cited

U.S. PATENT DOCUMENTS

| | | | |
|---|---|---|---|
| 5,012,401 A * | 4/1991 | Barlage ....................... 363/97 |
| 5,315,498 A | 5/1994 | Berrios et al. |
| 5,663,667 A | 9/1997 | Blum et al. |
| 5,991,172 A * | 11/1999 | Jovanovic et al. ........ 363/21.14 |
| 6,144,245 A | 11/2000 | Balogh |
| 6,201,417 B1 | 3/2001 | Blum et al. |
| 6,219,262 B1 | 4/2001 | Burgyan |
| 6,631,064 B2 * | 10/2003 | Schuellein et al. ......... 361/93.1 |
| 6,980,444 B2 * | 12/2005 | Takahashi ................. 363/21.18 |
| 7,035,119 B2 * | 4/2006 | Koike ........................... 363/19 |
| 7,233,504 B2 * | 6/2007 | Djenguerian et al. ..... 363/21.13 |
| 7,613,019 B2 * | 11/2009 | Kroes ....................... 363/56.03 |

* cited by examiner

*Primary Examiner*—Rajnikant B Patel
(74) *Attorney, Agent, or Firm*—Sidley Austin LLP

(57) ABSTRACT

A switch control device, a switch control method, and a converter using the same are disclosed. The converter includes: a switch; an energy transfer element that converts input energy into output energy according to a switching operation of the switch; and a switch control device that generates a first signal, which is maintained at a first level during a first interval starting from a first time at which the switch is turned on by using a feedback signal corresponding to the output energy and is then gradually lowered from the first level to the feedback signal during a second interval, and controls the switching operation of the switch by using a second signal corresponding to a current flowing at the switch and the first signal. A malfunction due to an LEC can be effectively prevented, and the converter and the converter controller can be implemented to be compact and low-priced.

59 Claims, 12 Drawing Sheets

SWITCH CONTROL DEVICE, SWITCH CONTROL METHOD, AND CONVERTER USING THE SAME

CROSS-REFERENCE TO RELATED APPLICATION

This application claims priority to and the benefit of Korean Patent Application No. 10-2007-0049136 filed in the Korean Intellectual Property Office on May 21, 2007, the entire contents of which are incorporated herein by reference.

BACKGROUND

1. Field of the Invention

The present invention relates to a switch control device capable of preventing a malfunction caused by a leading edge current (LEC), a switch control method, and a converter using the same.

2. Description of the Related Art

A converter is a power device that converts AC and DC signals. A converter may include an AC/DC converter that converts AC into DC, a DC/DC converter that converts DC into DC, and an inverter that converts DC into AC signals. A typical use of a converter is for a switching mode power supply (SMPS).

In general, a converter can adjust a drain-source current Ids flowing through a main switch by controlling a turn-off time of the main switch. The converter can use output voltage information corresponding to the load at an output terminal, thereby generating a more uniform, regulated output voltage. In order to prevent the main switch from being damaged by an overload or a short circuit at the output terminal, a maximum current limit ILIM can be set. When the Ids current reaches the maximum current limit ILIM, the main switch can be turned off. In this case, however, the main switch is turned off after an inevitable current limit delay time TCLD, caused by various circuit elements of the converter from the time at which the current Ids reaches the maximum current limit ILIM. The TCLD can be caused, for example, by an internal propagation delay time of a controller that controls an ON/OFF operation of the main switch and a turn-off delay time of the main switch.

Meanwhile, when the main switch is turned on, a leading edge current (LEC) may be generated, a phenomenon where the current Ids sharply increases and then drops due to a parasitic capacitance of the transformer and the switch. Therefore, the conventional converters include a leading edge blanking (LEB) circuit in order to prevent a malfunction caused by the LEC. The LEB circuit can perform an LEB operation such that the current Ids is not sensed during a time interval in which the LEC is generated, namely, during the leading edge blanking time, or LEB time. Conventional converters may also include an abnormal overcurrent protection (AOCP) circuit that can turn off the main switch when it senses an overcurrent possibly generated during the LEB time.

However, in using the LEB circuit, the current Ids cannot be sensed until the LEB operation ends after the main switch is turned on, and so a minimum turn-on state maintaining time (referred to as 'Tmin.on' hereinafter) of the main switch is approximately equivalent to the sum of the TCLD and the LEB time. In other words, the use of the LEB circuit lengthens the Tmin.on by the LEB time, compared with the case where the LEB circuit is not used. A problem associated with the lengthening of the Tmin.on will now be described with reference to FIGS. 1 and 2.

FIG. 1 illustrates a waveform of the current Ids when the main switch of a conventional converter is turned on or off in a normal state. Here, the normal state means that the converter output terminal is not overloaded or shorted.

The LEC is generated at a time T1 when the main switch of the conventional converter is turned on. Thereafter, during the LEB operation of the LEB circuit, the controller of the converter does not sense the current Ids during the LEB time from T1 to T2. In the normal state, the controller of the converter can compare the current Ids with a current corresponding to a feedback information, and when it senses that the Ids reaches the signal level of the feedback information, the controller turns off the main switch.

When the controller senses that the Ids has exceeded the current corresponding to the feedback information at the time T2 at which the LEB time expires, the controller turns off the main switch. In response, the main switch is turned off at a time T3, delayed by TCLD from the time T2. The Ids has a peak value IPEAK at the time T3 at which the main switch is turned off. Notably, the current Ids after the LEB time increases with a steeper slope as the voltage supplied to the converter increases, so the higher the input voltage becomes, the higher a current IDIFF becomes. Here, the IDIFF is a difference between IPEAK and the current corresponding to the feedback information at the time T3. This can cause serious problems and prevent conventional converters from properly controlling the current Ids, as shown in FIG. 2.

FIG. 2 illustrates a change in the current Ids according to the ON/OFF operation of the main switch of conventional converters when the output terminal of the converter is overloaded or short-circuited. When the output terminal of the converter is overloaded or short-circuited, the current Ids after the LEC appears much larger than the Ids in the normal state as shown in FIG. 1. However, in conventional converters, the main switch cannot be turned off during the Tmin.on, causing the peak value IPEAK of the Ids to exceed the maximum current limit ILIM, which can result in possible damage of the main switch.

Recently, intense research has been performed to reduce the size and cost of converters and the converter controller. However, it has been very difficult to obtain a compact and low-cost converter and converter controller as long as the conventional converters included the LEB circuit and the AOCP circuit for preventing the malfunction caused by the LEC.

The above information disclosed in this Background section is only for enhancement of understanding of the background of the invention and therefore it may contain information that does not form the prior art that is already known in this country to a person of ordinary skill in the art.

SUMMARY

Briefly and generally, embodiments include a switch control device, a switch control method, and a converter using the same having advantages of implementing a compact and low-cost converter and converter controller as well as effectively preventing a malfunction caused by an LEC.

An embodiment includes a switch control device of a converter that converts an input signal into an output signal according to a switching operation of a switch, the device including: a first signal generator that generates a first signal, which is maintained at a first level during a first interval after starting from a first time at which the switch is turned on and is then gradually lowered from the first level to a second level; a second signal generator that selectively outputs a signal with a higher level among a feedback signal corresponding to the output signal and the first signal; and a pulse width modulation (PWM) controller that compares a third signal corresponding to a current flowing through the switch and the output signal of the second signal generator, and controls the switching operation of the switch according to the comparison result.

Another embodiment includes a switch control device of a converter that converts an input signal into an output signal according to a switching operation of a switch, the device including: a first signal generator that generates a first signal, which is maintained at a first level during a first interval after starting from a first time at which the switch is turned on and is then gradually lowered from the first level to a second level; a second signal generator that selectively outputs a higher signal among a third level signal lower than the first level but higher than the second level and the first signal; and a PWM controller that compares a third signal corresponding to a current flowing through the switch and the output signal of the second signal generator, and controls the switching operation of the switch according to the comparison result.

Yet another embodiment includes a switch control method of a converter that converts an input signal into an output signal according to a switching operation of a switch, the method including: generating a first signal, which is maintained at a first level during a first interval after starting from a first time at which the switch is turned on and is then gradually lowered from the first level to a second level during a second interval, and a second signal by selecting a signal with a higher level among the first signal and a feedback signal corresponding to the output signal; comparing a third signal corresponding to a current flowing through the switch and the second signal; and controlling the switching operation of the switch according to the comparison result.

Still another embodiment includes a switch control method of a converter that converts an input signal into an output signal according to a switching operation of a switch, the method including: generating a first signal, which is maintained at a first level during a first interval starting from a first time at which the switch is turned on and is then gradually lowered from the first level to a second level during a second interval, and a second signal by selecting a signal with a higher level among the first signal and a third signal lower than the first level but higher than the second level; comparing a third signal corresponding to a current flowing through the switch and the second signal; and controlling the switching operation of the switch according to the comparison result.

Another embodiment includes a converter including: a switch; an energy transfer element that converts input energy into output energy according to a switching operation of the switch; and a switch control device that generates a first signal, which is maintained at a first level during a first interval starting from a first time at which the switch is turned on by using a feedback signal corresponding to the output energy and is then gradually lowered from the first level to the feedback signal during a second interval, and controls the switching operation of the switch by using a second signal corresponding to a current flowing through the switch and the first signal.

Another embodiment includes a converter including: a switch; an energy transfer element that converts input energy into output energy according to a switching operation of the switch; and a switch control device that generates a first signal, which is maintained at a first level during a first interval starting from a first time at which the switch is turned on and is then gradually lowered from the first level to a second level during a second interval, and controls the switching operation of the switch by using a second signal corresponding to a current flowing through the switch and the first signal.

DETAILED DESCRIPTION

In the following detailed description, only certain exemplary embodiments have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numbers designate like elements throughout the specification.

Throughout this specification and the claims that follow, when it is described that an element is "coupled" to another element, the element may be "directly coupled" to the other element or "electrically coupled" to the other element through a third element.

Figure 1:
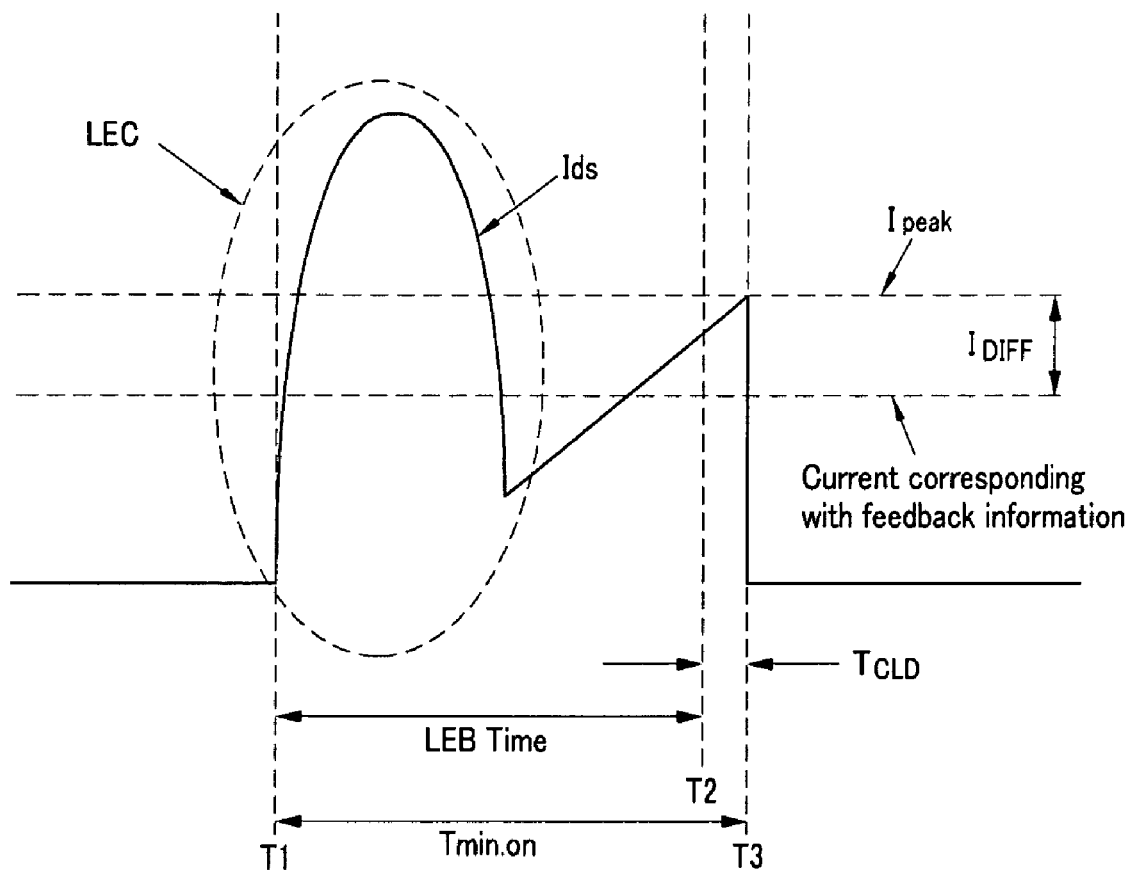
FIG. 1 illustrates a change of a current Ids in a normal state according to an ON/OFF operation of a main switch of a general converter.
Figure 2:
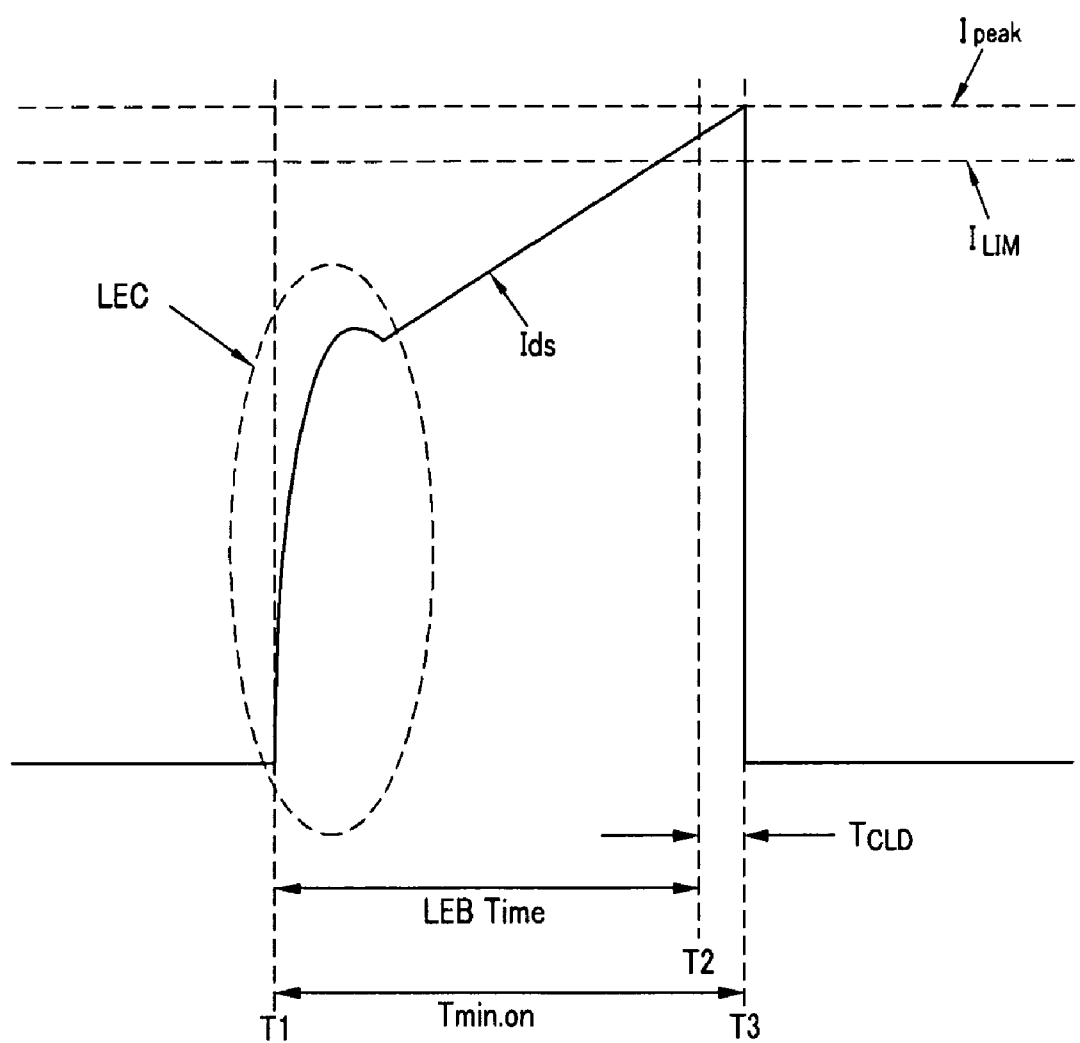
FIG. 2 illustrates a change in the Ids according to the ON/OFF operation of the main switch of the general converter when a converter output terminal is overloaded or short-circuited.
Figure 3:
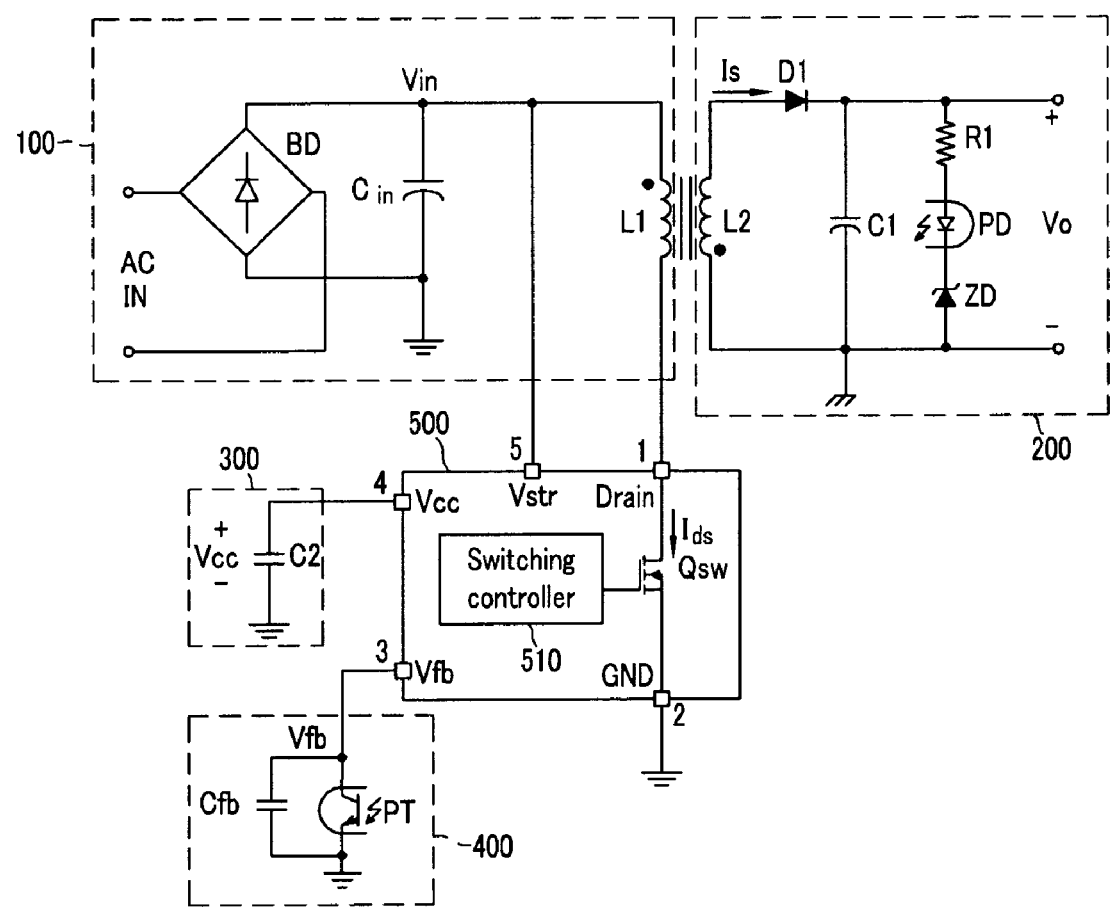
FIG. 3 is a schematic diagram of a converter.

FIG. 3 is a schematic diagram of a converter. The converter can include a power supply unit 100, an output unit 200, a bias voltage supply unit 300, a feedback circuit unit 400, and a switch control device 500.

The power supply unit 100 can include a bridge diode BD that rectifies an AC input AC IN, a capacitor Cin that smoothes the rectified voltage, and a primary coil L1 of a transformer having one terminal coupled to the capacitor Cin.

The output unit 200 can include a secondary coil L2 of the transformer, a diode D1 having an anode coupled to one terminal of the secondary coil L2 of the transformer, a capacitor C1 coupled between a cathode of the diode D1 and a ground, a resistor R1 having one terminal coupled to the cathode of the diode D1, a photodiode PD having an anode coupled to the other terminal of the resistor R1, and a Zener diode ZD having a cathode coupled to a cathode of the photodiode PD and an anode coupled to a ground terminal. Here, a voltage applied to both terminals of the capacitor C1 can be an output voltage Vo, and an amount of current flowing through the photodiode PD can change according to the output voltage magnitude Vo. The photodiode PD can constitute a photocoupler together with a photo transistor PT of the feedback circuit unit 400 and provide information corresponding to the output voltage to the feedback circuit unit 400.

The bias voltage supply unit 300 may include a capacitor C2 coupled between a bias voltage input terminal I/O #4 of the switch control device 500 and a ground terminal, and supply a bias voltage Vcc, charged in the capacitor C2, to the bias voltage input terminal I/O #4.

The feedback circuit unit 400 may include the photo transistor PT that forms the photocoupler together with the photodiode PD of the output unit 200 and a capacitor Cfb coupled in parallel to the photo transistor PT, and supply a feedback voltage Vfb charged in the capacitor Cfb to a feedback voltage input terminal I/O#3 of the switch control device 500. The photo transistor PT can be driven by a signal received from the photodiode PD of the output unit 200. Accordingly, when the output voltage Vo increases, the feedback voltage Vfb charged in the capacitor Cvb may decrease, and when the output voltage Vo decreases, the feedback voltage Vfb charged in the capacitor Cfb may increase.

The switch control device 500 can include a switching controller 510 and a switching transistor Qsw, and can have five input/output terminals. These I/O terminals may include a drain terminal I/O #1, a ground GND terminal I/O #2, a feedback voltage Vfb input/output terminal I/O #3, the bias voltage input terminal I/O #4, and a start voltage Vstr input terminal I/O #5. The drain terminal I/O #1 can be coupled to the other terminal of the primary coil L1 of the transformer, and the ground GND terminal I/O #2 can be coupled to a ground terminal. The feedback voltage Vfb input terminal I/O #3 can be coupled to a node between the photo transistor PT and the capacitor Cfb, and the bias voltage input terminal I/O #4 can be coupled to one terminal of the capacitor C2. The start voltage Vstr input terminal I/O #5 can be coupled to a node of the capacitor Cin and the primary coil L1 of the transformer.

Figure 4:
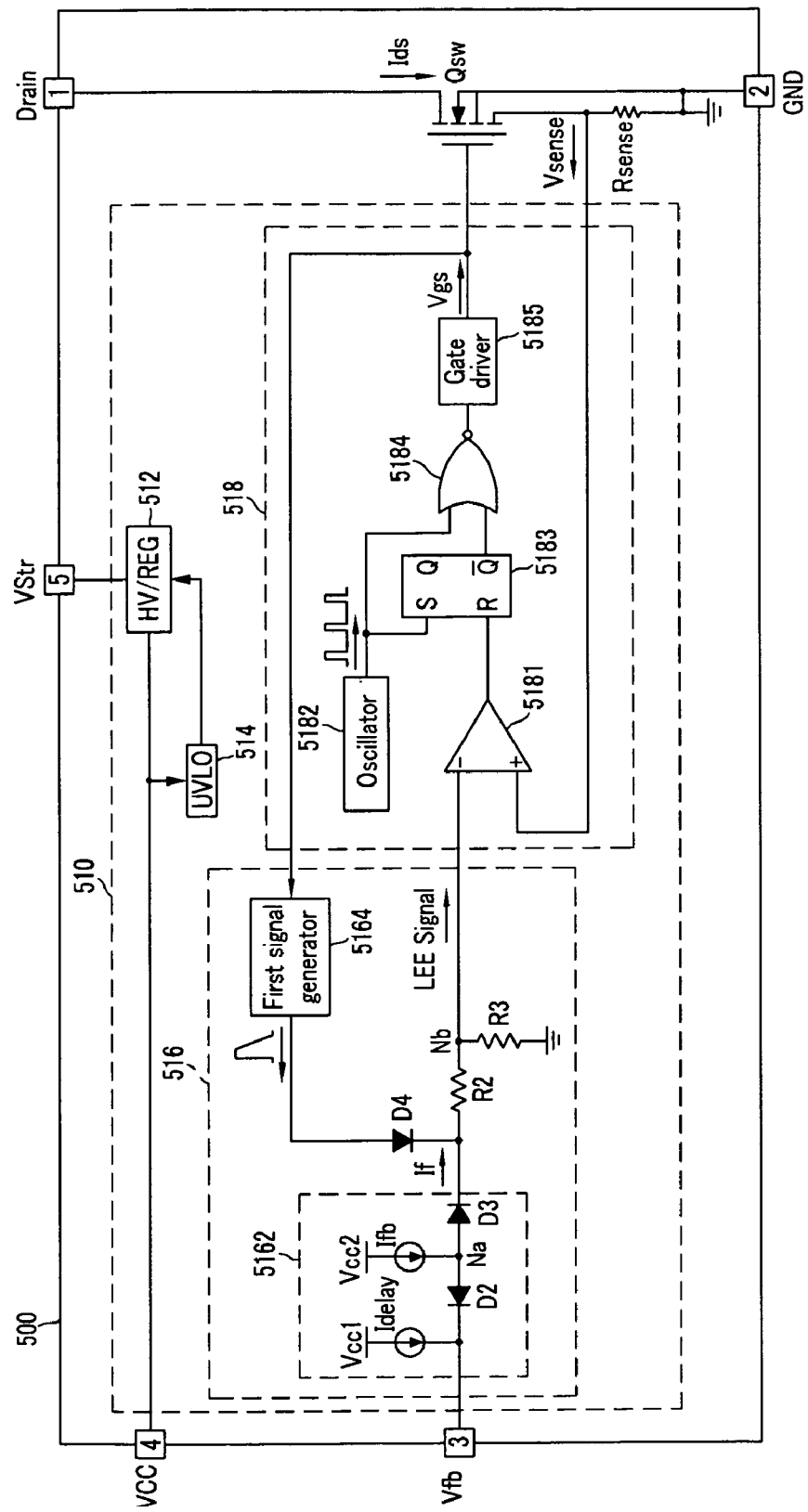
FIG. 4 is a schematic diagram of a switch control device 500.

FIG. 4 is a schematic diagram of the switch control device 500. The switch control device 500 can include the switching controller 510 and the switching transistor Qsw.

The switching controller 510 can include a high voltage regulator HV/REG 512, a under voltage lockout UVLO 514, a leading edge envelope LEE signal generator 516, and a PWM controller 518.

The HV/REG 512 may transfer a current corresponding to a voltage input through the start voltage Vstr input terminal I/O #5 to the capacitor C2 of the bias voltage supply unit 300 through the bias voltage input terminal I/O #4, to thereby generate the bias voltage Vcc.

The UVLO 514 may sense a voltage level of the bias voltage, and if the bias voltage is lowered to below a pre-set voltage level, the UVLO 514 can stop driving the switching controller 510. The bias voltage is used as a power source voltage for driving the switching controller 510. Therefore, if the bias voltage is lower than a certain level, the switching controller 510 may malfunction. Thus, in order to prevent a malfunction of the switching controller 510, the UVLO 514 can stop operating the switching controller 510 when the bias voltage becomes lower than the pre-set voltage level.

The LEE signal generator 516 can include a feedback signal generator 5162, a first signal generator 5164, a diode D4, and resistors R2 and R3. The anode of the diode D4 can be coupled to an output terminal of the first signal generator 5164, and a cathode of the diode D4 can be coupled to a node of an output terminal of the feedback signal generator 5162 and the resistor R2. One terminal of the resistor R2 can be coupled to the node of the output terminal of the feedback signal generator 5162 and the cathode of the diode D4, and the other terminal of the resistor R2 can be coupled to an inverting input terminal (−) of a comparator 5181 of the PWM controller 518. One terminal of the resistor R3 can be coupled to the other terminal of the resistor R2 at a node Nb, and the other terminal of the resistor R3 can be coupled to a ground terminal.

In other embodiments of the LEE signal generator 516, the type of connection of the output terminal of the feedback signal generator 5162, the diode D4, and the resistors R2 and R3 may be different from that as shown in FIG. 4. For example, the cathode of the diode D4 may be directly coupled to the node Nb, rather than being coupled to the node of the output terminal of the feedback signal generator 5162 and the resistor R2, and one terminal of the resistor R2 may be coupled to the output terminal of the feedback signal generator 5162, rather than being coupled to the node of the output terminal of the feedback signal generator 5162 and the cathode of the diode D4.

The feedback signal generator 5162 can include current sources Idelay and Ifb, and diodes D2 and D3. The current source Idelay can be coupled between a power source Vcc1 that supplies a voltage Vcc1 and the feedback voltage Vfb input terminal I/O #3, and supply a current to the feedback circuit unit 400. The current source Ifb can be coupled between a node Na of an anode of the diode D2 and that of the diode D3 and a power source Vcc2 that supplies a voltage Vcc2, and supply a current to the resistors R2 and R3 and the feedback circuit unit 400. Here, a cathode of the diode D3 can be the output terminal of the feedback signal generator 5162, and the feedback signal Vf can be a voltage applied to the node Nb according to an amount of a current If output to the resistors R2 and R3 from the feedback signal generator 5162.

When the feedback voltage Vfb is low, such as the voltage of the node Na is higher than a sum of a forward voltage of the diode D2 and the feedback voltage Vfb, the currents supplied from the current source Ifb may flow to the feedback circuit unit 400 through the diode D2 and the resistors R2 and R3 through the diode D3.

On the other hand, if the feedback voltage Vfb increases so that the voltage of the node Na is not higher than the sum of the forward voltage of the diode D2 and the feedback voltage Vfb, the diode D2 can turn off and the current supplied from the current source Ifb may flow only to the resistors R2 and R3 through the diode D3. Accordingly, although the output terminal of the output unit 200 can be overloaded or short-circuited and the feedback voltage Vfb may continuously increase, the feedback signal Vf is kept at a steady voltage.

The first signal generator 5164 may generate a first signal upon receiving a gate control signal Vgs that controls an ON/OFF operation of the switching transistor Qsw after being output from the PWM controller 518. This will now be described with reference to FIG. 5.

Figure 5:
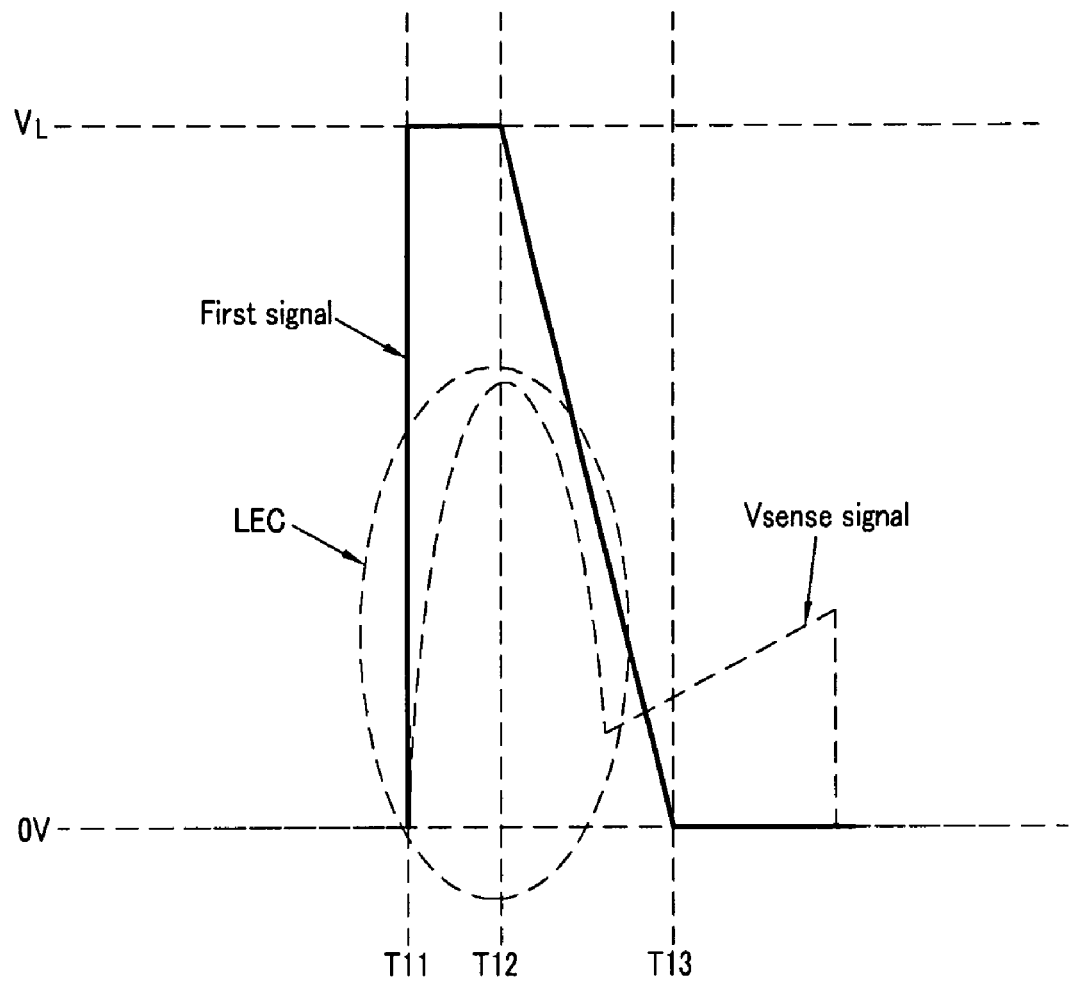
FIG. 5 illustrates a first signal generated by a first signal generator 5164.

FIG. 5 illustrates the first signal generated by the first signal generator 5164. The first signal generated by the first signal generator 5164 can have a signal level higher than that of a sense signal Vsense corresponding to a LEC while the LEC is being generated when the switching transistor Qsw is turned on.

The first signal can sharply increase from a reference voltage (0V in FIG. 5) to a voltage VL at a time T11, and remain steady until a time T12. At T12 the first signal can gradually decrease from the voltage VL to a reference voltage from the time T12 to a time T13. Here, the time T11 can be a time at which the gate control signal Vgs changes to a level for turning on the switching transistor Qsw.

The LEC can vary according to a level of the gate driving current input to a control electrode of the switching transistor Qsw. When the gate driving current is high, a signal level of the LEC can increase, while the interval of the LEC is shortened. If, however, the gate driving current becomes low, the signal level of the LEC decreases but the interval of the LEC can be lengthened. The greater the gate driving current, the more electromagnetic interference (EMI) is generated. The increased EMI can be handled by reinforcing the corresponding filter or by adding an additional filter. In order to address this problem, the gate driving current is set to be controlled within a desirable level, based on what value the voltage VL of the first signal is set. The first signal generator 5164 may be implemented to generate the first signal in synchronization with a rising edge or a falling edge of a pulse signal output from an oscillator 5182 of the PWM controller 518. If the first signal generator 5164 is operated in synchronization with the rising edge of an output signal of the oscillator 5182, the time T11 in FIG. 5 can be a time at which the output signal of the oscillator 5182 changes from a low level to a high level.

The first signal generator 5164 can vary the slope of a waveform of the first signal that falls from the voltage VL to the reference voltage in the T12 to T13 interval according to the level of the gate driving current. This will now be described with reference to FIG. 6.

Figure 6:
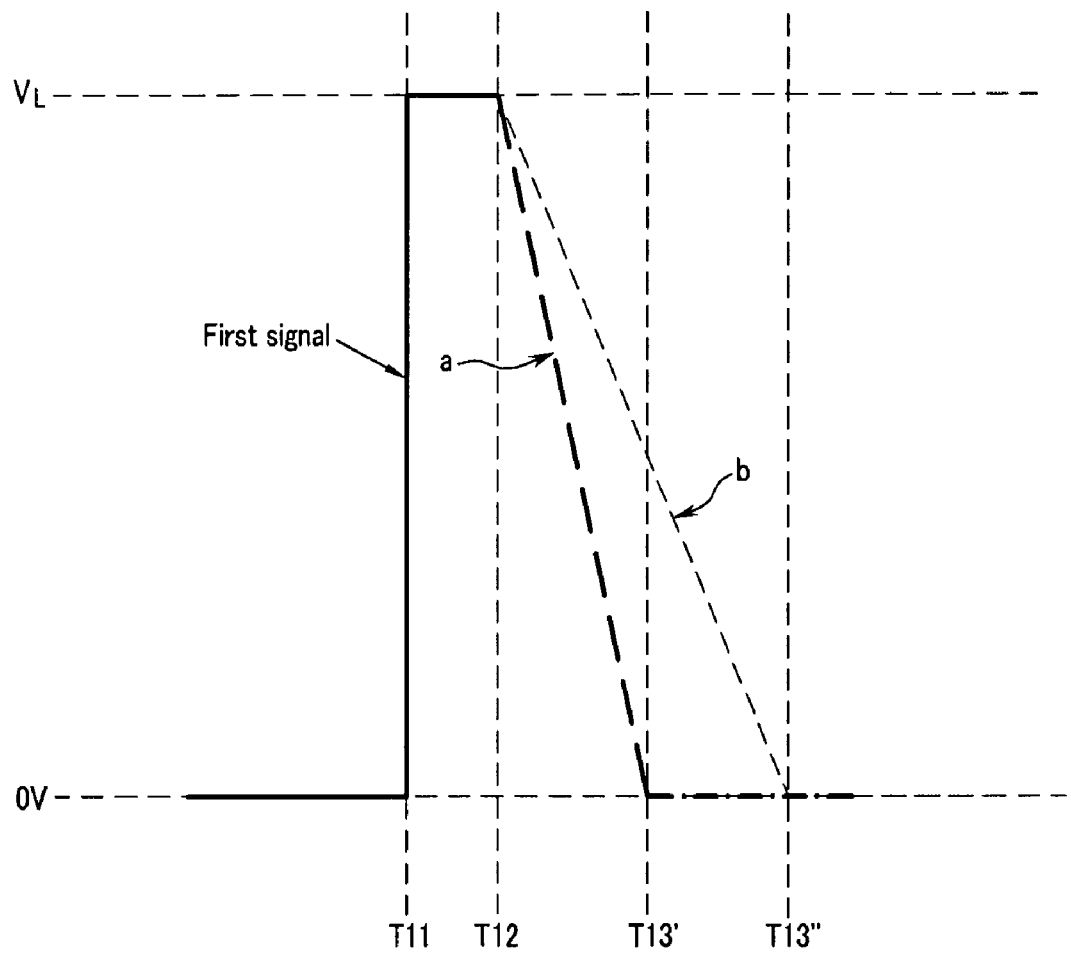
FIG. 6 illustrates a change in a falling period of the first signal generated by the first signal generator 5164.

FIG. 6 illustrates a change in the falling period of the first signal generated by the first signal generator 5164.

In FIG. 6, 'a' is a falling waveform of the first signal when the level of the gate driving current is high, and 'b' is a falling waveform of the first signal when the level of the gate driving current is low. When the level of the gate driving current is high, the first signal generator 5164 can control the slope of the first signal that falls from the voltage VL to the reference voltage, to be steep so that the first signal can reach the reference voltage at a time T13'. If, however, the level of the gate driving current is low, the first signal generator 5164 can control the slope of the first signal that falls from the voltage VL to the reference voltage to be moderate so that the first signal can reach the reference voltage at a time T13", which is later than the time T13'.

One reason for changing the slope of the falling waveform according to the level of the gate driving current is to sense the level of the sense signal Vsense faster after the LEC, when the level of the gate driving current is high, namely, when the LEC generation interval is short. In particular, if a high LEC is generated during the start-up operation of the converter, the LEC interval can be very short. By controlling the falling slope of the first signal, the level of the sense signal Vsense after the LEC can be quickly sensed to thus prevent malfunction of the switching transistor Qsw.

In some embodiments, the waveform falling from the voltage VL to the reference voltage from the time T12 to the time T13 can be implemented as a digital signal that gradually falls as a step waveform as well as an analog signal.

The LEE signal generator 516 can generate a LEE signal by selecting the higher of the feedback signal Vf and the first signal output from the first signal generator 5164. This will now be described with reference to FIG. 7.

Figure 7:
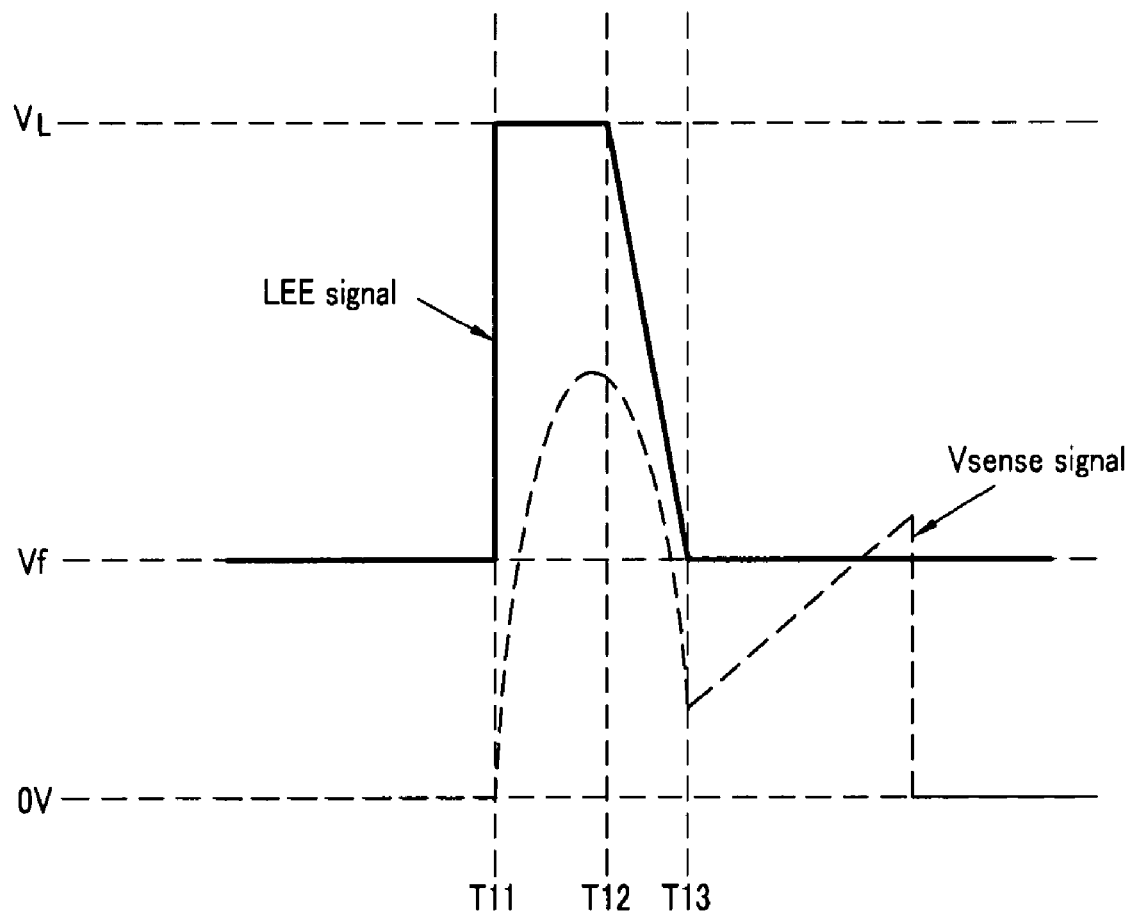
FIG. 7 illustrates a LEE signal generated by a LEE signal generator 516 included in the switch control device 500.

FIG. 7 illustrates the LEE signal generated by the LEE signal generator 516. Here, the LEE signal is the voltage applied to the node Nb according to output signals of the feedback signal generator 5162 and the first signal generator 5164.

The LEE signal generated by the LEE signal generator 516 can sharply increase from the voltage Vf at the time T11 to the voltage VL This VL voltage can be maintained until the time T12. The LEE signal is then gradually lowered from the voltage VL to the reference voltage from the time T12 to the time T13.

FIG. 4 illustrates that the PWM controller 518 can include a comparator 5181, an oscillator 5182, an SR flip-flop 5183, a NOR gate 5184, and a gate driver 5185.

The comparator 5181 can compare a signal level of the LEE signal input through the inverting input terminal (−) and that of the sense signal Vsense input through a non-inverting input terminal (+), and if the level of the LEE signal is higher than that of the sense signal Vsense, the comparator 5181 outputs a low level signal, whereas if the level of the LEE signal is lower than that of the sense signal Vsense, the comparator 5181 outputs a high level signal.

The oscillator 5182 can generate a pulse signal periodically toggled with a certain frequency and a rectangular pulse shape.

The SR flip-flop 5183 can transfer a high level signal or a low level signal output to a complementary output terminal /Q, to the NOR gate 5184 according to an output signal of the oscillator 5182 input to a set terminal (S) and an output signal of the comparator 5181 input to a reset terminal (R).

The NOR gate 5184 can perform a logical operation on an output signal of the oscillator 5182, input at one of two signal input terminals and on an output signal of the complementary output terminal /Q of the SR flipflop 5183 at another signal input terminal. The NOR gate 5184 can output a high or low level signal to the gate driver 5185 according to the result of the logical operation.

If the output signal of the NOR gate 5184 has a high level, the gate driver 5185 can generate a high level gate control signal Vgs, and if the output signal of the NOR gate 5184 has a low level, the gate driver 5185 can generate a low level gate control signal Vgs. The gate driver 5185 may transfer the generated gate control signal Vgs to the control electrode of the switching transistor Qsw to thus control an ON/OFF operation of the switching transistor Qsw.

If the sense signal Vsense is greater than the LEE signal, the comparator 5181 may output a high level signal, and accordingly, the output signal of the complementary output terminal /Q of the SR flipflop 5183 can change to have a high level. As the output signal of the complementary output terminal /Q of the SR flipflop 5183 changes to a high level, the output signal of the NOR gate 5184 changes to a low level, and accordingly, the switching transistor Qsw is turned off.

Figure 8:
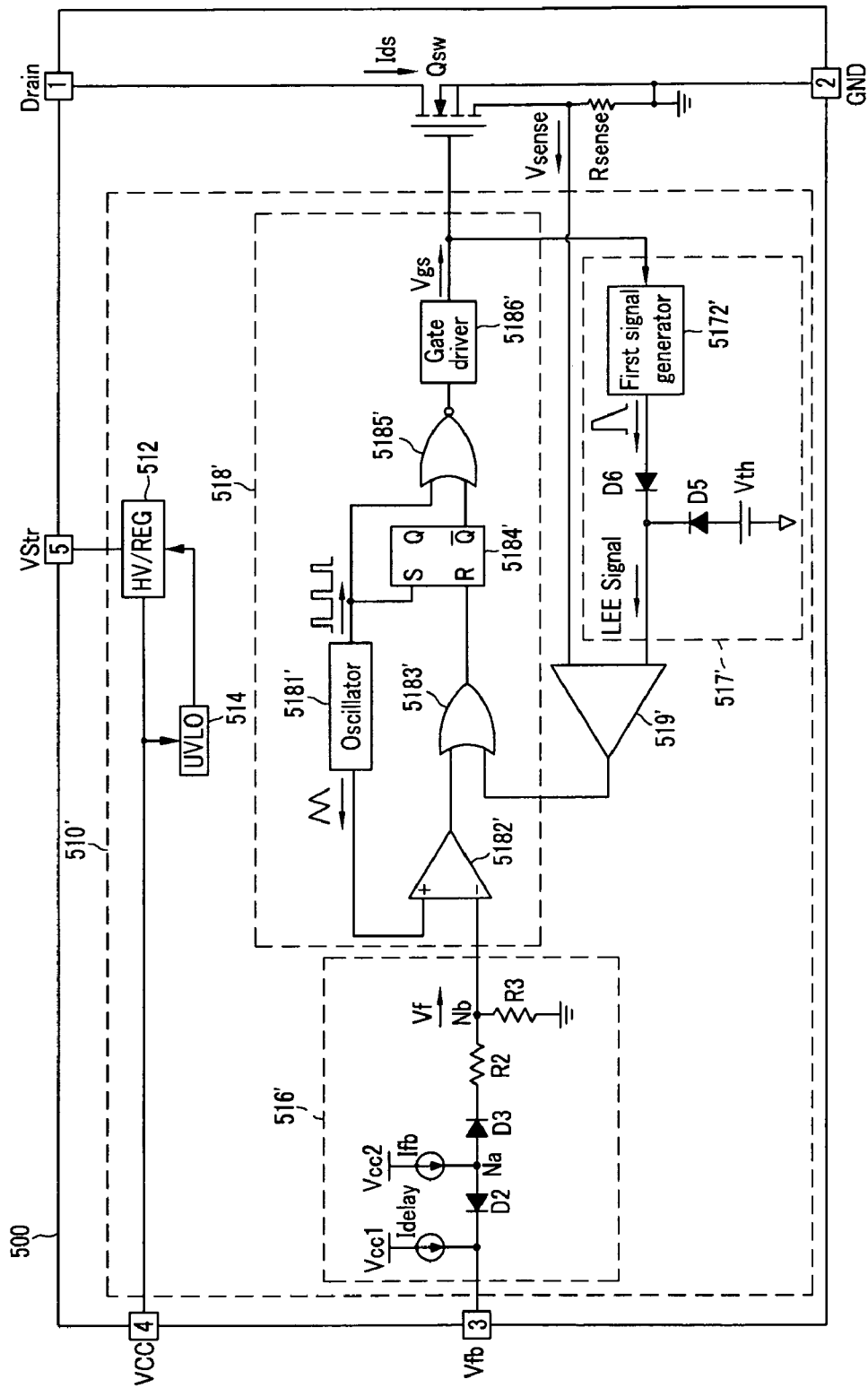
FIG. 8 is a schematic diagram of a switch control device 500'.

FIG. 8 is a schematic diagram of a switch control device 500'. The switch control device 500' can include a switching controller 510' and a switching transistor Qsw.

The switching controller 510' may include an HV/REG 512, a UVLO 514, a feedback signal generator 516', an LEE signal generator 517', a PWM controller 518', and a comparator 519'. Here, the HV/REG 512 and the UVLO 514 are given the same reference numbers as in FIG. 4, since they may operate in the same manner as the HV/REG 512 and the UVLO 514 of the switching controller 510 in FIG. 4. Correspondingly, their description will be omitted.

The feedback signal generator 516' can have the same structure as the LEE signal generator 516 as shown in FIG. 4, except for the first signal generator 5164 and the diode D4, and so the circuit elements included in the feedback signal generator 516' are given the same reference numbers as those included in the LEE signal generator 516. The feedback signal generator 516' can be operated in the same manner as the feedback signal generator 5162, and so description of the operation of the feedback signal generator 516' will be omitted.

The LEE signal generator 517' can include a first signal generator 5172', diodes D5 and D6, and a power source Vth.

The first signal generator 5172' may generate a first signal upon receiving a gate control signal Vgs that controls an ON/OFF operation of the switching transistor Qsw after being output from the PWM controller 518'. The first signal generated by the first signal generator 5172' can be the same as the first signal generated by the first signal generator 5164 as shown in FIG. 5, and so its description will be omitted.

The first signal generator 5172' may be implemented to be operated according to an output signal of an oscillator 5181' of the PWM controller 518', like the first signal generator 5164 included in the switch control device 500. In detail, the first signal generator 5172' may be implemented to generate the first signal in synchronization with a rising edge or a falling edge of the output signal of the oscillator 5181' of the PWM controller 518'. If the first signal generator 5172' is operated in synchronization with the rising edge of the output signal of the oscillator 5181', the time T11 in FIG. 5 is a time at which the output signal of the oscillator 5181' changes from a low level to a high level.

The LEE signal generator 517' can generate a LEE signal by selecting a signal with a higher level among the first signal output from the first signal generator 5172' and a signal Vth output from the power source Vth.

Figure 9:
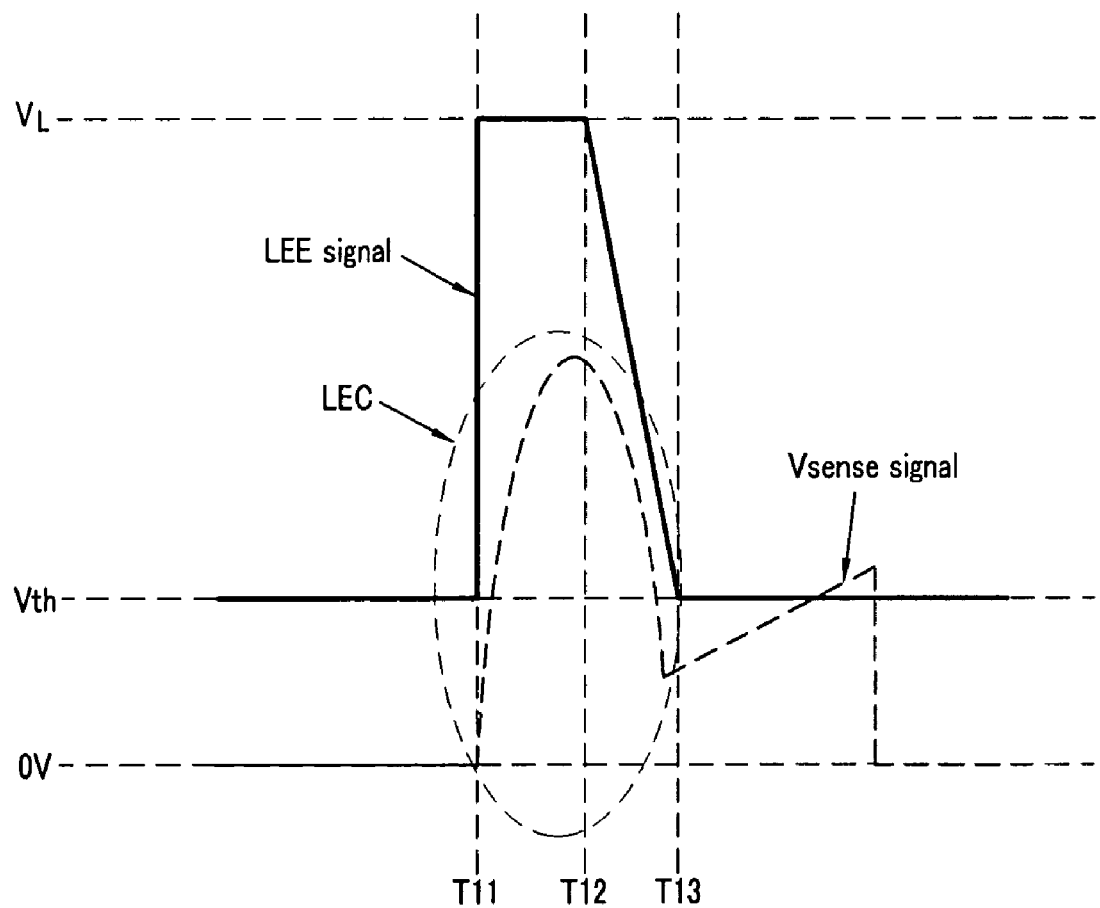
FIG. 9 illustrates a LEE signal generated by a LEE signal generator 517'.

FIG. 9 illustrates the LEE signal generated by the LEE signal generator 517'. The LEE signal generated by the LEE signal generator 517' can sharply increase from the voltage Vth to the voltage VL at the time T11 at which the gate control signal Vgs changes to have a level for turning on the switching transistor Qsw, which is then maintained until the time T12. Subsequently, the LEE signal can gradually decrease from the voltage VL to the voltage Vth from the time T12 to the time T13.

The comparator 519' may compare a signal level of the LEE signal input to the inverting input terminal (−) and that of a sense signal Vsense input to the non-inverting input terminal (+). If the level of the LEE signal is higher than that of the sense signal Vsense, the comparator 519' outputs a low level signal, whereas if the level of the LEE signal is lower than the sense signal Vsense, the comparator 519' outputs a high level signal.

The PWM controller 518' may include an oscillator 5181', a comparator 5182', an OR gate 5183', an SR flipflop 5184', a NOR gate 5185', and a GATE DRIVER 5186'.

The oscillator 5181' can generate a pulse signal periodically toggled with a certain frequency with a sawtooth waveform.

The comparator 5182' may compare a signal level of a feedback signal Vf input to the inverting input terminal (−) and that of the sawtooth signal input to the non-inverting input terminal (+). If the level of the feedback signal Vf is higher than that of the sawtooth signal, the comparator 5182' may output a low level signal, whereas if the level of the feedback signal Vf is lower than that of the sawtooth signal, the comparator 5182' may output a high level signal.

The OR gate 5183' can perform a logical operation on an output signal of the comparator 5182' which is input to one of its input terminals and an output signal of the comparator 519' which is input to the other input terminal, and transfer a high or low level signal to a reset terminal (R) of the SR flipflop 5184' according to the result of the logical operation.

According to an output signal of the oscillator 5181' that is input to a set terminal (S) and an output signal of the QR gate 5183' that is input to a reset terminal (R), the SR flipflop 5184' may transfer a high or low level signal output to a complementary output terminal /Q to the NOR gate 5185'.

The NOR gate 5185' may perform a logical operation on the output signal of the oscillator 5181' that is input to one of its two signal input terminals, and an output signal of the complementary output terminal /Q of the SR flipflop 5184' that is input to the other signal input terminal, and transfer a high or low level signal to the gate driver 5186' according to the result of the logical operation.

If the output signal of the NOR gate 5185' has a high level, the gate driver 5186' may generate a high level gate of control signal, and if the output signal of the NOR gate 5185' has a low level, the gate driver 5186' may generate a low level gate of control signal Vgs. In response, the gate driver 5186' can transfer the generated gate control signal Vgs to a control electrode of the switching transistor Qsw to control an ON/OFF operation of the switching transistor Qsw.

If the sense signal Vsense is greater than the LEE signal, the comparator 519' can output a high level signal, and accordingly, the output signal of the OR gate 5183' can change to a high level. As the output signal of the OR gate 5183' changes to a high level, the output signal of the complementary output terminal /Q of the SR flipflop 5184' can change to a high level. As the output signal of the complementary output terminal /Q of the SR flipflop 5184' changes to a high level, the output signal of the NOR gate 5185' has a low level, and accordingly, the switching transistor Qsw is turned off.

The switching transistor Qsw can be an n-type metal-oxide semiconductor field-effect transistor (MOSFET). The switching transistor Qsw may comprise a sense FET having a second source terminal where a current corresponding to a current flowing through a source terminal of the switching transistor Qsw flows. A gate terminal, or control electrode, of the switching transistor Qsw, can be coupled to output terminals of the gate drivers 5185 and 5186' of the switching controllers 510 and 510', and its ON/OFF operation is driven by the gate control signal Vgs output from the gate drivers 5185 and 5186'. A drain of the switching controller Qsw can be coupled to the drain terminal I/O #1, and a source terminal thereof can be coupled to the ground GND terminal I/O #2. The second source terminal may be coupled to the ground terminal through a resistor Rsense and transfers a sense signal Vsense sensed by a resistor Rsense to the switching controllers 510 and 510'.

In FIGS. 4 and 8, the switching transistor Qsw is shown as an n-type MOSFET, but in other embodiments, it can be a p-type MOSFET or any other switch that may have a similar structure and perform the same operation. In addition, in FIGS. 4 and 8, the switching controllers 510 and 510' and the switching transistors Qsw are implemented as a single chip. In other embodiments, they may be implemented differently. For example, the switching transistors Qsw of the switching controllers 510 and 510' and the switching transistors Qsw may be formed on separate chips, and the two chips may be formed as a single package or as separate packages.

The switch control devices 500 and 500' as shown in FIGS. 4 and 8 may use the LEE signal generated from the LEE signal generators 516 and 517', rather than using the LEB circuit included in the controller of the conventional converters, to thus prevent a malfunction caused by the LEC generated when the switching transistor Qsw is turned on.

In addition, the switch control devices 500 and 500' may turn off the switching transistor Qsw by using the LEE signal when the signal level of the LEC exceeds the voltage VL without having an AOCP, like certain conventional controllers. In detail, the controller of the conventional converters does not sense the Ids during the LEB duration: it starts sensing the Ids only starting from a time at which the LEB duration expires. If the sense signal Vsense, corresponding to the Ids, is higher than a certain level, namely, the feedback signal Vf in FIG. 7 or the signal Vth in FIG. 9, the controller turns off the switching transistor Qsw. In embodiments, however, the switch control devices 500 and 500' may not perform the LEB operation but compare the LEE signal generated from the LEE signal generators 516 and 517' with the sense signal Vsense corresponding to the Ids, and if the sense signal Vsense is greater than the Ids, the switch control devices 500 and 500' turn off the switching transistor Qsw.

Figure 10:
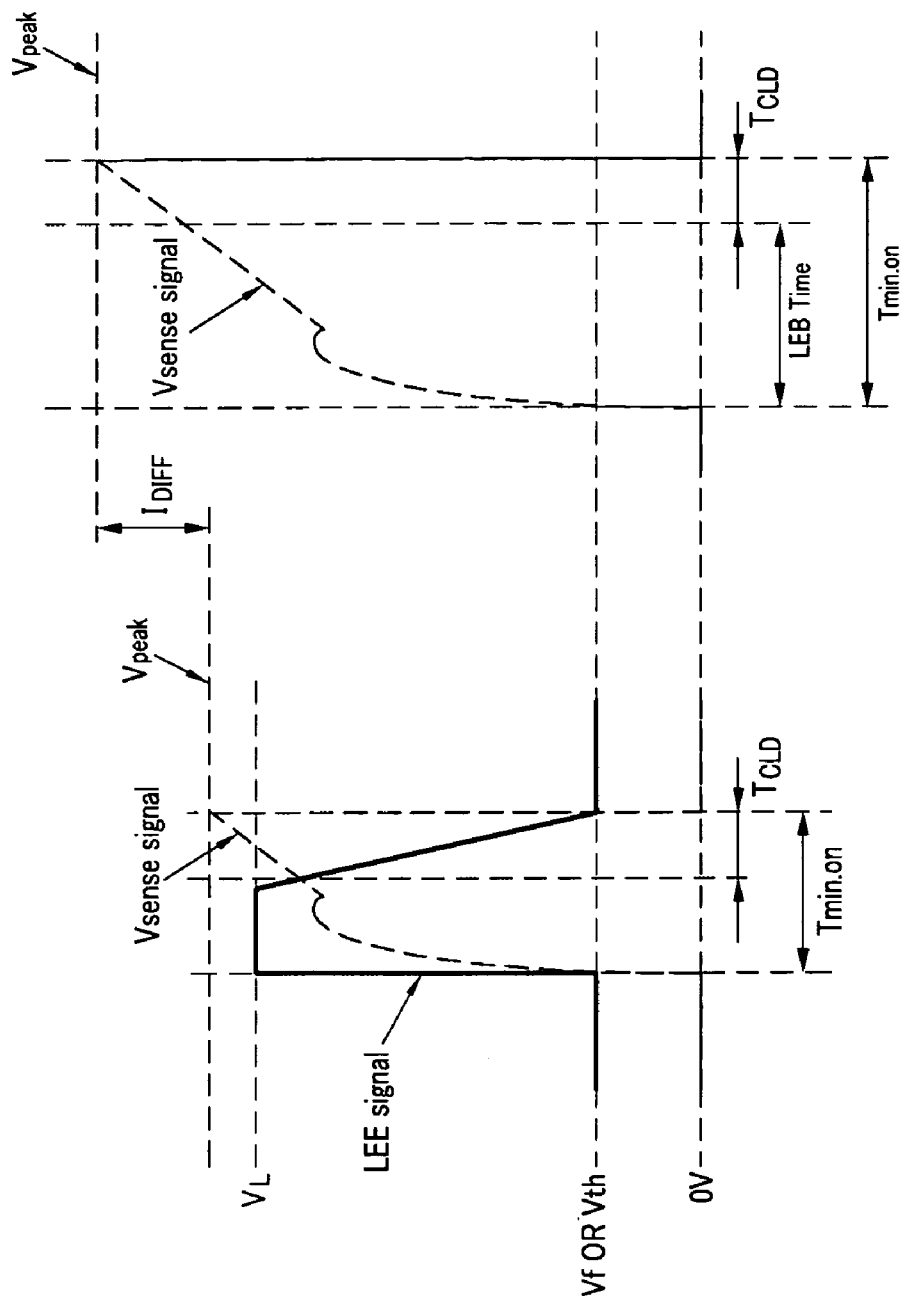
FIG. 10 illustrates a comparison between a sense signal (Vsense) and a maximum value (Vpeak) of the converter and those of the general converter when an output terminal is overloaded or short-circuited.

Thus, when the output terminal of the converter is overloaded or short-circuited, the switch control devices 500 and 500' can considerably reduce the peak value IPEAK of the ids compared with the controller of the conventional converters as shown in FIG. 10.

FIG. 10 illustrates a comparison between the sense signal (Vsense) and the maximum value (Vpeak) of the converter and those of the general converters when the output terminal is overloaded or short-circuited. Here, the maximum value Vpeak of the sense signal Vsense means a signal level of the sense signal Vsense when the Ids reaches the peak value IPEAK.

As shown in FIG. 10, when the output terminal is overloaded or short-circuited, in the switch control devices 500 and 500', Tmin.on, the time taken for sensing the level of the sense signal Vsense from the time at which the switching transistor Qsw is turned on to the time at which the switching transistor Qsw is turned off, can be shorter than that taken in the controller of the conventional converters. Accordingly, the maximum value Vpeak of the sense signal Vsense cannot become higher than a certain level. Here, the sense signal Vsense is proportional to the Ids, and so the switch controllers 500 and 500' control the Ids such that the Ids may not be increased to above a certain level. Thus, when the output terminal is overloaded or short-circuited, the increased amount of the Ids can be reduced, and accordingly, the increased amount of the Ids by more than a maximum current limit (ILIM) can also be reduced. This will now be described with reference to FIGS. 11 and 12.

An example of a conventional converter can be analogous to the switching controller 510 of the switch control device 500 but without the first signal generator 5164 and the diode D4.

Figure 11:
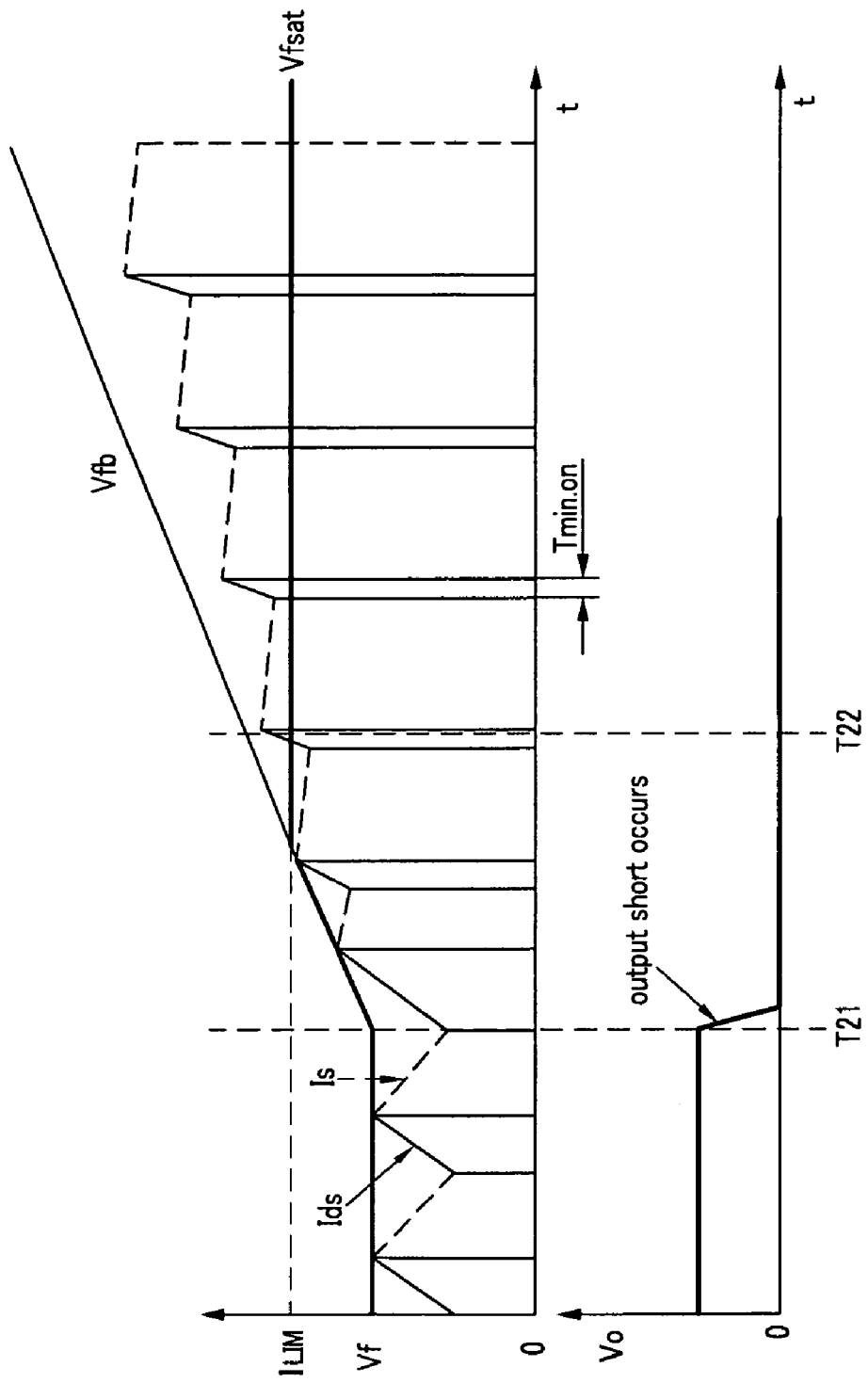
FIG. 11 illustrates of a change in an output voltage Vo, a feedback voltage Vfb, a feedback signal Vf, an Ids, and an Is when the output terminal of the general converter is short-circuited.

FIG. 11 illustrates a change in the output voltage Vo, the feedback voltage Vfb, the feedback signal Vf, the Ids, and the Is when the output terminal of the conventional converter is short-circuited.

At a time T21 at which the output terminal of the conventional converter is short-circuited, the output voltage Vo of the converter is sharply lowered to 0V. As the output voltage Vo is sharply lowered at the time T21, the feedback signal Vf is increased up to a saturation feedback voltage Vfsat at a time T22. The saturation feedback voltage Vfsat is a maximum voltage that can be output by the feedback signal generator 5162. The controller is designed that although the feedback voltage Vfb is increased to a level higher than that of the saturation feedback voltage Vfsat, the feedback signal generator 5162 cannot output a voltage higher than the saturation feedback voltage Vfsat. Here, the saturation feedback voltage Vfsat is a voltage of the node Nb when the diode D2 is turned off so that a current of the current source Ifb entirely flows to the resistors R2 and R3.

In the short circuit, the saturation feedback voltage Vfsat can determine the maximum current limit ILIM of the Ids. In detail, the saturation feedback voltage Vfsat is the output voltage of the feedback signal generator 5162 when the whole current from the current source Ifb flows through the resistors R2 and R3 as the diode D2 is turned off. When the sense signal Vsense reaches the saturation feedback voltage Vfsat, the converter controller can turn off the switching transistor Qsw, and so the maximum current limit ILIM of the Ids is determined according to the saturation feedback voltage Vfsat.

Meanwhile, as the output terminal of the converter keeps being short-circuited, the Ids and the Is current flowing through the diode D1 of the output unit 200 continuously increase. At this time, the Tmin.on can be a major factor for determining the amount of an increase in the Ids and the Is whenever the switching transistor Qsw is turned on and off.

Figure 12:
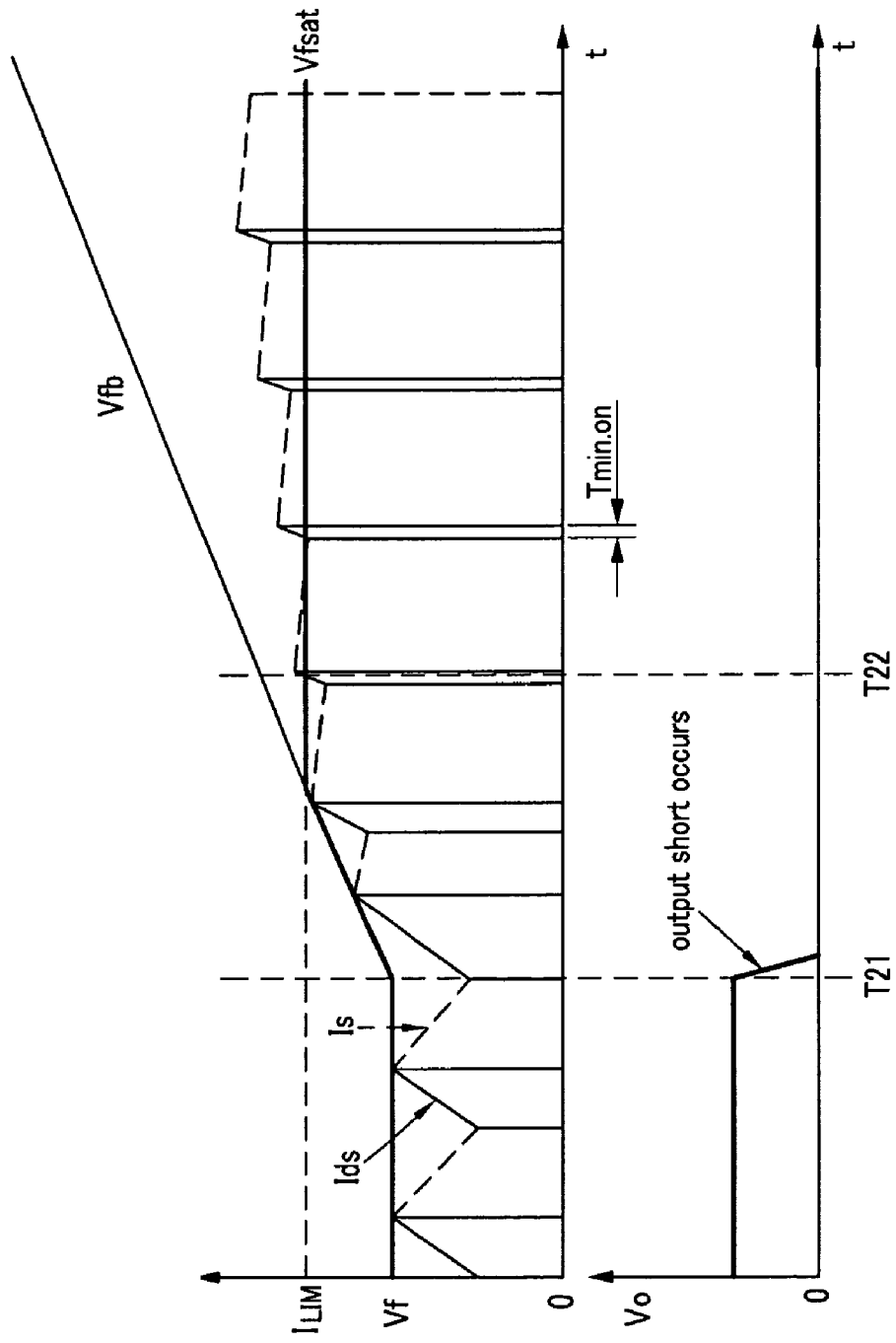
FIG. 12 illustrates a change in the output voltage Vo, the feedback voltage Vfb, the feedback signal Vf, the Ids, and the Is when the output terminal of the converter.

When the output terminal is overloaded or short-circuited, the switching controllers 510 and 510' of the switch control devices 500 and 500' can control the Tmin.on to be shorter than that of the controller of the conventional converters, and accordingly, the speed of the increase in the Ids is lowered as shown in FIG. 12.

FIG. 12 illustrates the change in the output voltage Vo, the feedback voltage Vfb, the feedback signal Vf, the Ids, and the Is when the output terminal of the converter is short-circuited.

As shown in FIG. 12, in the short state of the output terminal, the amount of the increase in the Ids and the Is of the converter is lowered compared with that of the conventional converters.

The converter need not be like the described flyback converter of an SMPS as shown in FIG. 3; the converter can be any other type of converter, such as an SMPS that does not include a transformer.

The converter can generate the LEE signal and prevent a malfunction possibly caused by the LEC generated when the switching transistor Qsw is turned on by using the LEE signal. Also, because the converter can quickly sense the level of the sense signal Vsense after the LEC, the Tmin.on can be shortened when the output terminal is overloaded or short-circuited. In addition, because the LEE signal generators 516 and 517' can vary the LEE signal according to the level of the gate driving current input to the control electrode of the switching transistor Qsw, a malfunction of the switching transistor Qsw that can occur during the start-up operation can be prevented. Moreover, compared with the conventional converter including the LEB circuit and the AOCP circuit in order to prevent the malfunction caused by the LEC, embodiments of the converter can prevent a malfunction caused by the LEC with only the LEE signal generators 516 and 517', and so the converter and the converter controller can be fabricated to be compact at a low cost.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A switch control device of a converter that converts an input signal into an output signal according to a switching operation of a switch, the switch control device comprising:
   a first signal generator configured to generate a first signal, which is maintained at a first level during a first interval after starting from a first time at which the switch is turned on and is then gradually lowered from the first level to a second level;

a second signal generator configured to selectively output the higher of the feedback signal corresponding to the output signal and the first signal; and a pulse width modulation (PWM) controller configured to compare a third signal corresponding to a current flowing through the switch and an output signal of the second signal generator, and to control the switching operation of the switch according to the comparison result.

2. The device of claim 1, wherein the first signal generator is configured to change the length of the second interval according to a level of a control signal applied to a control electrode of the switch.

3. The device of claim 2, wherein the first signal generator is configured to change the length of the second interval to become shorter as the level of the control signal is increased.

4. The device of claim 1, wherein the first signal has the second level before the first time.

5. The device of claim 1, wherein the second signal generator comprises:

a first diode that receives a fourth signal corresponding to the output signal input to its anode and outputs the feedback signal through its cathode; and a second diode having a cathode coupled to a node of the cathode of the first diode and an output terminal of the second signal generator, and an anode coupled to an output terminal of the first signal generator.

6. The device of claim 5, wherein the second signal generator further comprises:

a resistor coupled between a node of the first and second diodes and a first power source that supplies a first voltage, wherein an output signal of the second signal generator is a voltage applied to the resistor.

7. The device of claim 6, wherein the first voltage is a ground voltage.

8. The device of claim 6, wherein the first voltage is the same as a voltage that has been applied to a source terminal of the switch.

9. The device of claim 5, wherein the feedback signal has a level lower than the first level.

10. The device of claim 1, wherein the PWM controller is configured to turn off the switch when the third signal is higher than an output signal of the second signal generator.

11. The device of claim 1, wherein the switch and the switch control device are formed as a single chip.

12. The device of claim 1, wherein the switch and the switch control device are formed as separate chips, and the chips are formed as a single package or separate packages.

13. A switch control device of a converter that converts an input signal into an output signal according to a switching operation of a switch, the switch control device comprising:

a first signal generator configured to generate a first signal, which is maintained at a first level during a first interval after starting from a first time at which the switch is turned on and is then gradually lowered from the first level to a second level;

a second signal generator configured to selectively output the higher of a third level signal lower than the first level but higher than the second level and the first signal; and a pulse width modulation (PWM) controller configured to control the switching operation of the switch according to a result obtained by comparing a third signal corresponding to a current flowing at the switch and the output signal of the second signal generator.

14. The device of claim 13, wherein the first signal generator is configured to change a slope of the first signal decreasing from the first level to the second level according to a level of a control signal applied to a control electrode of the switch from the PWM controller.

15. The device of claim 14, wherein the first signal generator is configured to increase the slope of the first signal as the level of the control signal is increased.

16. The device of claim 13, wherein the first signal has the second level before the first time.

17. The device of claim 13, wherein the second signal generator comprises:

a first diode having an anode coupled to a power source that supplies the third level signal and a cathode coupled to an output terminal of the second signal generator; and a second diode having an anode coupled to an output terminal of the first signal generator and a cathode coupled to the cathode of the first diode.

18. The device of claim 17, further comprising:

a comparator, configured to compare the third signal and the output signal of the second signal generator, to generate a fourth signal, which has a fourth level if the third signal is greater than the output signal of the second signal generator according to the comparison result and has a fifth level if the third signal is smaller than the output signal of the second signal generator according to the comparison result, and to transfer the generated signal to the PWM controller.

19. The device of claim 18, wherein if the fourth signal has the fourth level, the PWM controller turns off the switch.

20. The device of claim 18, wherein the fourth level is a high level and the fifth level is a low level.

21. The device of claim 13, wherein the switch and the switch control device are formed as a single chip.

22. The device of claim 13, wherein the switch and the switch control device are formed as separate chips, respectively, and the respective chips are formed as a single package or separate packages, respectively.

23. A switch control method of a converter that converts an input signal into an output signal according to a switching operation of a switch, the method comprising:

generating a first signal, which is maintained at a first level during a first interval starting from a first time at which the switch is turned on and is then gradually lowered from the first level to a second level during a second interval; and generating a second signal by selecting a signal with a higher level among the first signal and a feedback signal corresponding to the output signal;

comparing a third signal corresponding to a current flowing through the switch and the second signal; and controlling the switching operation of the switch according to the comparison result.

24. The method of claim 23, wherein the length of the second interval is changed according to a level of a control signal that controls the operation of the switch.

25. The method of claim 24, wherein as the level of the control signal is increased, the length of the second interval is shortened.

26. The method of claim 23, wherein the feedback signal corresponds to the output signal and has a level lower than the first level.

27. The method of claim 23, wherein the first signal has the second level before the first time.

28. The method of claim 23, wherein the controlling of the switching operation of the switch comprises:

turning off the switch when the third signal is higher than the second signal according to the comparison result.

29. A switch control method of a converter that converts an input signal into an output signal according to a switching operation of a switch, the method comprising:
- generating a first signal, which is maintained at a first level during a first interval starting from a first time at which the switch is turned on and is then gradually lowered from the first level to a second level during a second interval, and a second signal by selecting a signal with a higher level among the first signal and a third signal lower than the first level but higher than the second level;
- comparing a third signal corresponding to a current flowing through the switch and the second signal; and
- controlling the switching operation of the switch according to the comparison result.

30. The method of claim 29, wherein the slope of the first signal lowered from the first level to the second level is changed according to a level of a control signal that controls the operation of the switch.

31. The method of claim 30, wherein the slope of the first signal is increased as the level of the control signal is increased.

32. The method of claim 29, wherein the first signal has the second level before the first time.

33. The method of claim 29, wherein the controlling of the switching operation of the switch comprises:
- turning off the switch when the third signal is higher than the second signal according to the comparison result.

34. A converter comprising:
- a switch;
- an energy transfer element that converts input energy into output energy according to a switching operation of the switch; and
- a switch control device configured to generate a first signal, which is maintained at a first level during a first interval starting from a first time at which the switch is turned on by using a feedback signal corresponding to the output energy and is then gradually lowered from the first level to the feedback signal during a second interval, and to control the switching operation of the switch by using a second signal corresponding to a current flowing through the switch and the first signal.

35. The converter of claim 34, wherein the switch control device comprises:
- a first signal generator configured to generate a first signal upon receiving a control signal that controls the operation of the switch and a feedback voltage corresponding to the output energy; and
- a pulse width modulation (PWM) controller configured to compare the second signal with the first signal, and controls the switching operation of the switch according to a comparison result.

36. The converter of claim 35, wherein, when the second signal is higher than the first signal, the PWM controller turns off the switch.

37. The converter of claim 35, wherein the first signal generator comprises:
- a third signal generator configured to generate a third signal, which is maintained at the first level during the first interval starting from the first time and is then gradually lowered from the first level to the second level during the second interval;
- a feedback signal generator configured to generate the feedback signal by converting the feedback voltage; and
- a first signal output unit configured to selectively output a signal with a higher level among the third signal and the feedback signal.

38. The converter of claim 37, wherein the third signal generator changes the length of the second interval according to a level of the control signal.

39. The converter of claim 38, wherein the third signal generator shortens the length of the second interval as the level of the control signal is increased.

40. The converter of claim 37, wherein the third signal has the second level before the first time.

41. The converter of claim 37, wherein the feedback signal has a level lower than the first level.

42. The converter of claim 37, wherein the feedback signal generator comprises a first diode that receives a fourth signal corresponding to the feedback voltage input to its anode and outputs the feedback signal through its cathode, and the first signal output unit comprises a second diode having a cathode coupled to a node of a cathode of the first diode and an output terminal of the first signal generator and an anode coupled to an output terminal of the third signal generator.

43. The converter of claim 42, wherein the first signal output unit further comprises a resistor coupled between a node of the first and second diodes and a first power source that supplies a first voltage,
- wherein an output signal of the first signal generator is a voltage applied to the resistor.

44. The converter of claim 43, wherein the first voltage is a ground voltage.

45. The converter of claim 43, wherein the first voltage is the same as a voltage that has been applied to a source terminal of the switch.

46. The converter of claim 34, wherein the energy transfer element is a transformer, and the switch is coupled to a primary coil of the transformer.

47. The converter of claim 34, wherein the energy transfer element is an inductor, and one terminal of the switch is coupled to the inductor.

48. A converter comprising:
- a switch;
- an energy transfer element that converts input energy into output energy according to a switching operation of the switch; and
- a switch control device that generates a first signal, which is maintained at a first level during a first interval starting from a first time at which the switch is turned on and is then gradually lowered from the first level to a second level during a second interval, and controls the switching operation of the switch by using a second signal corresponding to a current flowing at the switch and the first signal.

49. The converter of claim 48, wherein the switch control device comprises:
- a first signal generator that generates a first signal upon receiving a control signal that controls the operation of the switch; and
- a pulse width modulation (PWM) controller that controls the switching operation of the switch according to a result obtained by comparing the second signal and the first signal.

50. The converter of claim 49, wherein the first signal generator comprises:
- a third signal generator that generates a third signal, which is maintained at the first level during the first interval starting from the first time and is then gradually lowered from the first level to a third level lower than the second level during the second interval;
- a second level signal generator that generates a second level signal by converting a fourth signal corresponding to the second level; and a first signal output unit that selectively outputs a signal with a higher level among the third signal and the second level signal.

51. The converter of claim 50, wherein the third signal has the third level before the first time.

52. The converter of claim 50, wherein the third signal generator changes the slope of the third signal lowered from the first level to the third level according to a level of the control signal.

53. The converter of claim 52, wherein the third signal generator changes the slope of the third signal to be steep as the level of the control signal is increased.

54. The converter of claim 50, wherein the second level signal generator comprises a first diode having an anode coupled to a power source that supplies the fourth signal and outputs the second level signal through its cathode, and the first signal output unit comprises a second diode having a cathode coupled to a node of the cathode of the first diode and an output terminal of the first signal generator and an anode coupled to an output terminal of the third signal generator.

55. The converter of claim 50, wherein the switch control device further comprises:

a comparator that compares the second signal and the output signal of the first signal generator, generates a fifth signal that has a fourth level if the second signal is greater than the output signal of the first signal generator according to the comparison result and has a fifth level if the second signal is smaller than the output signal of the first signal generator according to the comparison result, and transfers the generated fifth signal to the PWM controller.

56. The converter of claim 55, wherein the PWM controller turns off the switch when the fifth signal has the fourth level.

57. The converter of claim 56, wherein the fourth level is a high level and the fifth level is a low level.

58. The converter of claim 48, wherein the energy transfer element is a transformer, and the switch is coupled to a primary coil of the transformer.

59. The converter of claim 48, wherein the energy transfer element is an inductor, and one terminal of the switch is coupled to the inductor.

* * * * *